(12) United States Patent
Kutsumizu et al.

(10) Patent No.: US 9,878,521 B2
(45) Date of Patent: Jan. 30, 2018

(54) METHOD FOR PRODUCING RESIN MOLDED BODY AND GRAPHITE SHEET LAMINATE

(71) Applicant: KANEKA CORPORATION, Osaka-shi, Osaka (JP)

(72) Inventors: Makoto Kutsumizu, Settsu (JP); Yusuke Ohta, Settsu (JP); Satoshi Katayama, Settsu (JP); Takashi Inada, Settsu (JP); Motoaki Kobayashi, Settsu (JP); Yasushi Nishikawa, Settsu (JP)

(73) Assignee: KANEKA CORPORATION, Osaka-Shi (JP)

( * ) Notice: Subject to any disclaimer, the term of this patent is extended or adjusted under 35 U.S.C. 154(b) by 370 days.

(21) Appl. No.: 14/765,053

(22) PCT Filed: Jan. 30, 2014

(86) PCT No.: PCT/JP2014/052124
§ 371 (c)(1),
(2) Date: Jul. 31, 2015

(87) PCT Pub. No.: WO2014/119666
PCT Pub. Date: Aug. 7, 2014

(65) Prior Publication Data
US 2015/0375480 A1 Dec. 31, 2015

(30) Foreign Application Priority Data

Feb. 1, 2013 (JP) .................................. 2013-018534
Feb. 12, 2013 (JP) .................................. 2013-024795

(51) Int. Cl.
*B32B 9/00* (2006.01)
*B32B 7/02* (2006.01)
(Continued)

(52) U.S. Cl.
CPC .......... *B32B 9/007* (2013.01); *B29C 45/0005* (2013.01); *B29C 45/14* (2013.01);
(Continued)

(58) Field of Classification Search
CPC .. B32B 7/02; B32B 9/007; B32B 9/04; B32B 9/045; B32B 38/00; B32B 27/308;
(Continued)

(56) References Cited

U.S. PATENT DOCUMENTS

2009/0011245 A1 1/2009 Tsai et al.
2010/0132871 A1 6/2010 Hattori et al.

FOREIGN PATENT DOCUMENTS

JP 11-179830 A 7/1999
JP 2006-306068 A 11/2006
(Continued)

OTHER PUBLICATIONS

"Materials Data Book: 2003 Edition". Cambridge University Engineering Department, (2003); pp. 1-37 (Year: 2003).*
(Continued)

*Primary Examiner* — Prashant J Khatri
(74) *Attorney, Agent, or Firm* — Birch, Stewart, Kolasch & Birch, LLP

(57) ABSTRACT

In order to prevent positional displacement of a graphite sheet laminate during production of a resin molded product obtained by integrally molding the graphite sheet laminate and a resin, the present invention uses a graphite sheet laminate having a structure in which a first fixing layer having a modulus of elasticity of not less than $7.0 \times 10^4$ Pa and not more than $5.0 \times 10^7$ Pa at 250° C. is in contact with a graphite sheet on at least one of principal surfaces of the graphite sheet.

20 Claims, 3 Drawing Sheets

(51) Int. Cl.
  *B32B 9/04* (2006.01)
  *B32B 38/00* (2006.01)
  *B29C 45/14* (2006.01)
  *B29C 45/00* (2006.01)
  *B32B 27/30* (2006.01)
  *B32B 27/42* (2006.01)
  *B32B 27/38* (2006.01)
  *B29K 707/04* (2006.01)
  *C08J 5/04* (2006.01)
  *B29L 9/00* (2006.01)

(52) U.S. Cl.
  CPC .......... *B29C 45/14811* (2013.01); *B32B 7/02* (2013.01); *B32B 9/04* (2013.01); *B32B 9/045* (2013.01); *B32B 38/00* (2013.01); *B29C 2045/0012* (2013.01); *B29K 2707/04* (2013.01); *B29L 2009/00* (2013.01); *B32B 27/308* (2013.01); *B32B 27/38* (2013.01); *B32B 27/42* (2013.01); *B32B 2307/51* (2013.01); *B32B 2457/00* (2013.01); *C08J 5/042* (2013.01)

(58) Field of Classification Search
  CPC ... B32B 27/38; B32B 27/42; B29C 45/14811; B29C 45/14; B29C 45/0005; C08J 5/042
  See application file for complete search history.

(56) References Cited

FOREIGN PATENT DOCUMENTS

| | | |
|---|---|---|
| JP | 2008-272976 A | 11/2008 |
| JP | 2010-10599 A | 1/2010 |
| JP | 2010-149509 A | 7/2010 |
| JP | 2012-45920 A | 3/2012 |
| TW | 201240591 A1 | 10/2012 |

OTHER PUBLICATIONS

International Search Report (Form PCT/ISA/210) for International Application No. PCT/JP2014/052124, dated Apr. 22, 2014.
International Preliminary Report on Patentability and Written Opinion of the International Searching Authority (Forms PCT/IB/338, PCT/IB/373 and PCT/ISA/237) for International Application No. PCT/JP2014/052124, dated Aug. 13, 2015.
Chinese Office Action and Chinese Search Report, dated Aug. 3, 2016, for Chinese Application No. 201480006911.3, along with English translations.
Taiwanese Office Action and Search Report, dated Nov. 7, 2016, for Taiwanese Application No. 103103683, as well as an English translation.

* cited by examiner

METHOD FOR PRODUCING RESIN MOLDED BODY AND GRAPHITE SHEET LAMINATE

TECHNICAL FIELD

The present invention relates to a graphite sheet laminate and a resin molded product production method in which the graphite sheet laminate is used to produce a resin molded product in which a resin and a graphite sheet are integrally molded.

BACKGROUND ART

In recent years, a raise in functionality of an IC and a CPU has caused a rapid increase in density at which an electronic device generates heat. Against a background of this, for example, a low temperature burn caused by a local increase in temperature in a part which faces a heat-generated member such as an IC or a CPU has been regarded as a problem. In view of this, a graphite sheet which has a thermal conductivity which is high and excellent in anisotropy has gained attention.

Generally, a graphite sheet may be used in an electronic device as below. A graphite composite obtained by combining the graphite sheet and an adhesive layer such as a double-sided adhesive tape is combined via the adhesive layer with a resin molded product constituting a casing. Alternatively, a casing of the electronic device which casing has a high thermal conductivity while being thin is obtained by inserting the graphite sheet into the casing, which is being molded, so as to make a composite in which the graphite sheet is a part of the casing.

For example, Patent Literature 1 discloses a method for molding a composite of a graphite film and a resin by an insert molding method in which a graphite sheet is placed in a molding mold and then a resin material is injection-molded in that mold. However, the method disclosed in Patent Literature 1 has a problem such that, in a case where insert molding is carried out by use of the graphite sheet itself and the resin of which a molded product is made is injected, the resin does not well adhere to the graphite sheet, so that positional displacement of the graphite sheet occurs.

CITATION LIST

Patent Literature

Patent Literature 1
Japanese Patent Application Publication, Tokukaihei, No. 11-179830 A (Publication Date: Jul. 6, 1999)

SUMMARY OF INVENTION

Technical Problem

An object of the present invention is to produce, by insert molding, a product in which a graphite sheet and a resin are integrally molded while the graphite sheet is not positionally displaced.

Solution to Problem

In order to attain the object, a method of the present invention for producing a resin molded product, includes the steps of: providing, along a cavity surface of one of injection molding molds, a graphite sheet laminate having a structure in which a first fixing layer having a modulus of elasticity of not less than $7.0 \times 10^4$ Pa and not more than $5.0 \times 10^7$ Pa at an introduced resin temperature during injection molding is in contact with a graphite sheet on at least one of principal surfaces of the graphite sheet, the graphite sheet laminate being provided so that a principal surface of the graphite sheet laminate which principal surface is opposite from the first fixing layer side principal surface of the graphite sheet laminate is in contact with the cavity surface; clamping the injection molding molds together; and injecting a resin in a molten state into a cavity so as to cause adhesion of the graphite sheet laminate and the resin.

In order to attain the object, a method of the present invention for producing a resin molded product, includes the steps of: providing, along a cavity surface of one of injection molding molds, a graphite sheet laminate having a structure in which a first fixing layer having a modulus of elasticity of not less than $7.0 \times 10^4$ Pa and not more than $5.0 \times 10^7$ Pa at 250° C. is in contact with a graphite sheet on at least one of principal surfaces of the graphite sheet, the graphite sheet laminate being provided so that a principal surface of the graphite sheet laminate which principal surface is opposite from the first fixing layer side principal surface of the graphite sheet laminate is in contact with the cavity surface; clamping the injection molding molds together; and injecting a resin in a molten state into a cavity so as to cause adhesion of the graphite sheet laminate and the resin.

The method of the present invention is preferably configured such that a second fixing layer having a modulus of elasticity of not less than $7.0 \times 10^4$ Pa and not more than $5.0 \times 10^8$ Pa at the introduced resin temperature during injection molding is provided on a principal surface of the graphite sheet which principal surface is opposite from the first fixing layer side principal surface of the graphite sheet.

The method of the present invention is preferably configured such that the introduced resin temperature during injection molding is not less than 230° C. and not more than 350° C.

The method of the present invention is preferably configured such that a support is further provided on a principal surface of the second fixing layer which principal surface is opposite from the graphite sheet side principal surface of the second fixing layer.

The method of the present invention is preferably configured such that the support has a thickness of 1 μm to 50 μm.

The method of the present invention is preferably configured such that a thickness of the graphite sheet is 5% to 75% of a thickness of the graphite sheet laminate.

In order to attain the object, a graphite sheet laminate of the present invention has a structure in which a first fixing layer having a modulus of elasticity of not less than $7.0 \times 10^4$ Pa and not more than $5.0 \times 10^7$ Pa at 250° C. is in contact with a graphite sheet on at least one of principal surfaces of the graphite sheet.

The graphite sheet laminate of the present invention is preferably configured such that the first fixing layer has a modulus of elasticity of not less than $1.0 \times 10^4$ Pa and not more than $5.0 \times 10^6$ Pa at 80° C.

The graphite sheet laminate of the present invention is preferably configured such that the first fixing layer has a higher modulus of elasticity at 250° C. than at 80° C.

The graphite sheet laminate of the present invention is preferably configured to further have a structure in which a second fixing layer having a modulus of elasticity of not less than $1.0 \times 10^4$ Pa and not more than $5.0 \times 10^7$ Pa at 80° C. and having a modulus of elasticity of not less than $7.0 \times 10^4$ Pa and not more than $5.0×10^8$ Pa at 250° C. is in contact with the graphite sheet on a principal surface of the graphite sheet which principal surface is opposite from the first fixing layer side principal surface of the graphite sheet.

The graphite sheet laminate of the present invention is preferably configured such that the second fixing layer has a higher modulus of elasticity at 250° C. than at 80° C.

The graphite sheet laminate of the present invention is preferably configured such that: the second fixing layer is provided on the principal surface of the graphite sheet which principal surface is opposite from the first fixing layer side principal surface of the graphite sheet; and a support is further provided on a principal surface of the second fixing layer which principal surface is opposite from the graphite sheet side principal surface of the second fixing layer.

The graphite sheet laminate of the present invention is preferably configured such that the support has a thickness of 1 μm to 50 μm.

The graphite sheet laminate of the present invention is preferably configured such that a thickness of the graphite sheet is 5% to 75% of a thickness of the graphite sheet laminate.

Advantageous Effects of Invention

The present invention makes it possible to prevent positional displacement of a graphite sheet during injection molding carried out by providing a graphite sheet laminate along a cavity surface of an injection molding mold so that a first fixing layer of the graphite sheet laminate is in contact with the cavity surface.

DESCRIPTION OF EMBODIMENTS

Figure 1:
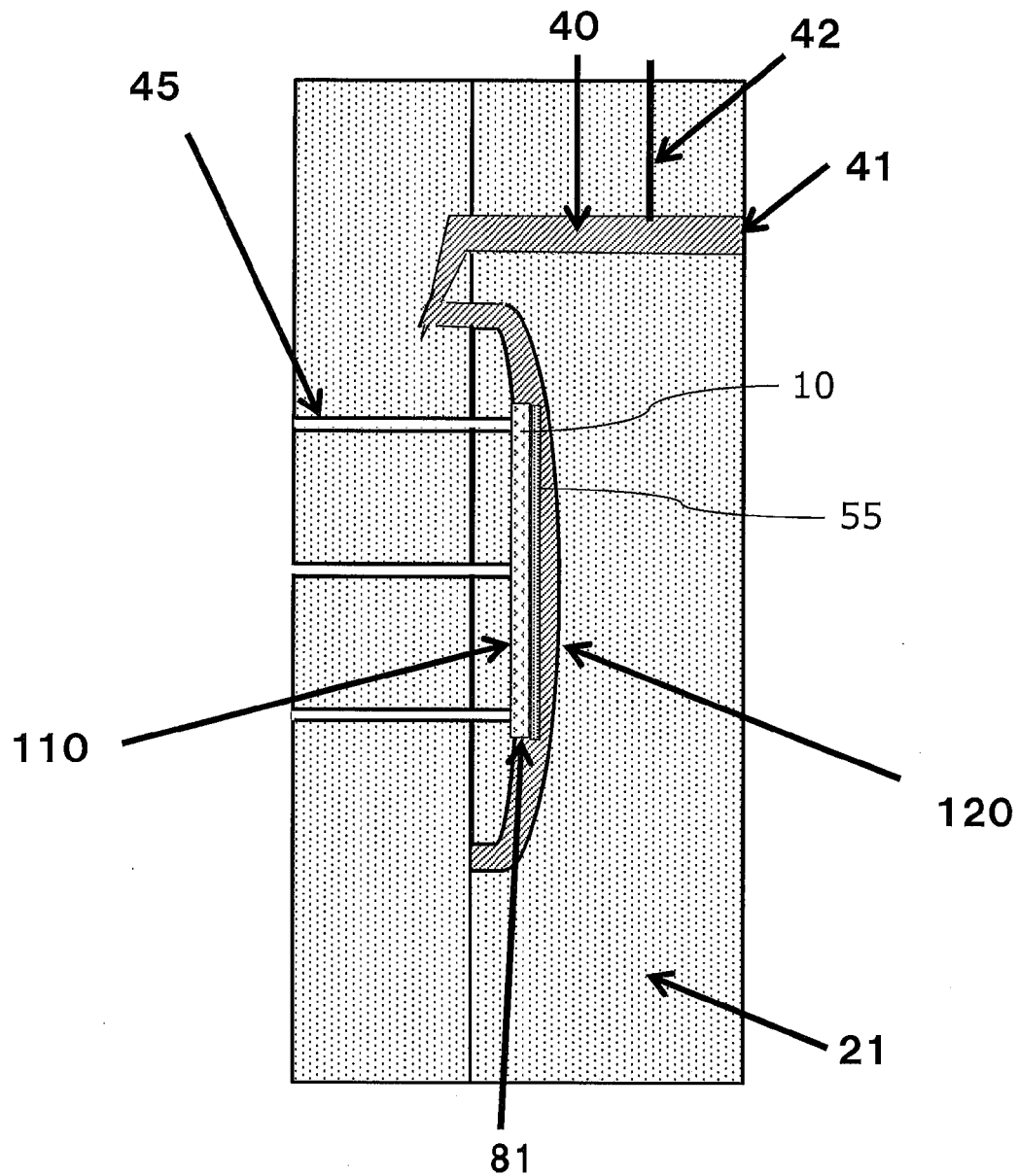
FIG. 1 illustrates how a mold and a graphite sheet laminate are arranged in injection molding.

The present invention is a method for producing a resin molded product, including the steps of: providing, along a cavity surface 110 of one of injection molding molds, a graphite sheet laminate 81 having a structure in which a first fixing layer 55 having a modulus of elasticity of not less than $7.0×10^4$ Pa and not more than $5.0×10^7$ Pa at an introduced resin temperature during injection molding is in contact with a graphite sheet 10 on at least one of principal surfaces of the graphite sheet 10, the graphite sheet laminate 81 being provided so that a principal surface of the graphite sheet laminate 81 which principal surface is opposite from the first fixing layer 55 side principal surface of the graphite sheet laminate 81 is in contact with the cavity surface 110; clamping the injection molding molds together; and injecting a resin in a molten state into a cavity so as to cause adhesion of the graphite sheet laminate 81 and the resin. Note here that the introduced resin temperature during injection molding refers to a resin temperature at a tip of a gate 40 of an injection molding machine with reference to FIG. 1. The resin temperature is measured by inserting a thermocouple 42 from a mold toward the gate 40 and setting the thermocouple 42 so that the thermocouple 42 is in contact with the resin. Note that the thermocouple 42 is inserted from the mold into the gate 40 so as not to prevent introduction of the resin.

Note that the "principal surface" herein means a surface having a large area out of surfaces forming a face of a structure (e.g., a graphite sheet or a graphite laminate).

For example, the "principal surface" may be a surface having the largest area or a surface having the second largest area out of surfaces forming a face of a structure.

More specifically, it can be assumed that one of principal surfaces is a surface having the largest area and the other of the principal surfaces is a surface having an area identical to (or substantially identical to) that of the one of the principal surfaces. Alternatively, it can be assumed that one of principal surfaces is a surface having the largest area and the other of the principal surfaces is a surface having the second largest area. It can also be assumed that one of principal surfaces is a surface having the second largest area and the other of the principal surfaces is a surface having the largest area.

It can be assumed that, in a case where the total area of surfaces forming a face of a structure is 100(%), the "principal surface" may be a surface whose area accounts for not less than 30(%) of the total area, a surface whose area accounts for not less than 40(%) of the total area, a surface whose area accounts for not less than 50(%) of the total area, a surface whose area accounts for not less than 60(%) of the total area, a surface whose area accounts for not less than 70(%) of the total area, a surface whose area accounts for not less than 80(%) of the total area, or a surface whose area accounts for not less than 90(%) of the total area.

The graphite sheet laminate is specifically described below.

<First Fixing Layer>

The first fixing layer 55 is set in a mold 21 so as to be in contact with an injected resin (see FIG. 1). The first fixing layer 55 carries out a function so that the graphite sheet laminate 81 is provided without being displaced with respect to a molded product. It is preferable to select the first fixing layer 55 whose modulus of elasticity at the introduced resin temperature is not less than $7.0×10^4$ Pa and not more than $5.0×10^7$ Pa, preferably not less than $8.5×10^4$ Pa and not more than $3.0×10^7$ Pa, and more preferably not less than $1.0×10^5$ Pa and not more than $1.0×10^7$ Pa. Further, a resin introduction temperature is preferably not less than 230° C. and not more than 350° C. (e.g., 250° C. or 310° C.). In a case where the first fixing layer 55 has a modulus of elasticity of not less than $7.0×10^4$ Pa and not more than $5.0×10^7$ Pa at the introduced resin temperature, even if injection molding in which an introduced resin may have an introduction temperature of not less than 300° C. is carried out, the first fixing layer 55 is not carried away. Also in a case where the graphite sheet 10 which is less surface-active and less adhesive to another material is used, the graphite sheet laminate 81 can be set at a desired position of the resin molded product. Further, by setting the modulus of elasticity of the first fixing layer 55 at moderate softness, the first fixing layer 55 can be tacky, can be adhesive to the introduced resin (i.e., the resin of which the molded product is made), and can prevent positional displacement and poor adhesion.

More specifically, the modulus of elasticity of the first fixing layer 55 at the introduced resin temperature may be not less than $1.0\times10^5$ and not more than $3.2\times10^7$, not less than $1.0\times10^5$ and not more than $1.0\times10^7$, or not less than $2.1\times10^6$ and not more than $3.2\times10^7$. Also in a case where the first fixing layer 55 has a modulus of elasticity in the above range at the introduced resin temperature, even if injection molding in which an introduced resin may have an introduction temperature of not less than 300° C. is carried out, the first fixing layer 55 is not carried away. Also in a case where the graphite sheet 10 which is less surface-active and less adhesive to another material is used, the graphite sheet laminate 81 can be set at a desired position of the resin molded product. Further, by setting the modulus of elasticity of the first fixing layer 55 at moderate softness, the first fixing layer 55 can be tacky, can be adhesive to the introduced resin (i.e., the resin of which the molded product is made), and can prevent positional displacement and poor adhesion.

The modulus of elasticity of the first fixing layer 55 at a mold temperature is preferably not less than $1.0\times10^4$ Pa and not more than $5.0\times10^6$ Pa, more preferably not less than $5.0\times10^4$ Pa and not more than $3.0\times10^6$ Pa, and still more preferably not less than $8.0\times10^4$ Pa and not more than $1.0\times10^6$ Pa. In a case where the first fixing layer 55 has a modulus of elasticity of not less than $1.0\times10^4$ Pa and not more than $5.0\times10^6$ Pa at the mold temperature, the graphite sheet laminate 81 is not carried away when a high-temperature resin is introduced. This makes it possible to prevent positional displacement of the graphite sheet laminate 81. Further, since the first fixing layer 55 has preferable softness, in a case where an introduced resin enters the first fixing layer 55 by colliding with the first fixing layer 55, the first fixing layer 55 and the resin can have a large area of contact. Further, the mold temperature is preferably not less than 70° C. and not more than 150° C. (e.g., 80° C.).

More specifically, the modulus of elasticity of the first fixing layer 55 at the mold temperature may be not less than $3.0\times10^5$ and not more than $5.0\times10^7$, not less than $8.5\times10^6$ and not more than $5.0\times10^7$, or not less than $3.0\times10^5$ and not more than $4.0\times10^6$. Also in a case where the first fixing layer 55 has a modulus of elasticity in the above range at the mold temperature, the graphite sheet laminate 81 is not carried away when a high-temperature resin is introduced. This makes it possible to prevent positional displacement of the graphite sheet laminate 81. Further, since the first fixing layer 55 has preferable softness, in a case where an introduced resin enters the first fixing layer 55 by colliding with the first fixing layer 55, the first fixing layer 55 and the resin can have a large area of contact.

Further, the first fixing layer 55 preferably has a modulus of elasticity of not less than $1.0\times10^4$ Pa and not more than $5.0\times10^6$ Pa at the mold temperature and a modulus of elasticity of not less than $7.0\times10^4$ Pa and not more than $5.0\times10^7$ Pa at the introduced resin temperature. The first fixing layer 55 more preferably has a modulus of elasticity of not less than $5.0\times10^4$ Pa and not more than $3.0\times10^6$ Pa at the mold temperature and a modulus of elasticity of not less than $8.5\times10^4$ Pa and not more than $3.0\times10^7$ Pa at the introduced resin temperature. The first fixing layer 55 still more preferably has a modulus of elasticity of not less than $8.0\times10^4$ Pa and not more than $1.0\times10^6$ Pa at the mold temperature and a modulus of elasticity of not less than $1.0\times10^5$ Pa and not more than $1.0\times10^7$ Pa at the introduced resin temperature. Note here that the modulus of elasticity at the mold temperature refers to a modulus of elasticity at any temperature in a range of 70° C. to 150° C. Note also that the modulus of elasticity at the introduced resin temperature refers to a modulus of elasticity at any temperature in a range of 230° C. to 350° C. It is preferable to use the first fixing layer 55 whose modulus of elasticity at any temperature in the range of 70° C. to 150° C. is a modulus of elasticity in the above range at the mold temperature and whose modulus of elasticity at any temperature in the range of 230° C. to 350° C. raised from the any temperature in the range of 70° C. to 150° C. is a modulus of elasticity in the above range at the introduced resin temperature.

More specifically, in a case where the first fixing layer 55 has a modulus of elasticity of not less than $1.0\times10^5$ and not more than $3.2\times10^7$ at the introduced resin temperature, the first fixing layer 55 may have a modulus of elasticity of not less than $3.0\times10^5$ and not more than $5.0\times10^7$, not less than $8.5\times10^6$ and not more than $5.0\times10^7$, or not less than $3.0\times10^5$ and not more than $4.0\times10^6$ at the mold temperature. Furthermore, in a case where the first fixing layer 55 has a modulus of elasticity of not less than $1.0\times10^5$ and not more than $1.0\times10^7$ at the introduced resin temperature, the first fixing layer 55 may have a modulus of elasticity of not less than $3.0\times10^5$ and not more than $5.0\times10^7$, not less than $8.5\times10^6$ and not more than $5.0\times10^7$, or not less than $3.0\times10^5$ and not more than $4.0\times10^6$ at the mold temperature. Moreover, in a case where the first fixing layer 55 has a modulus of elasticity of not less than $2.1\times10^6$ and not more than $3.2\times10^7$ at the introduced resin temperature, the first fixing layer 55 may have a modulus of elasticity of not less than $3.0\times10^5$ and not more than $5.0\times10^7$, not less than $8.5\times10^6$ and not more than $5.0\times10^7$, or not less than $3.0\times10^5$ and not more than $4.0\times10^6$ at the mold temperature.

The first fixing layer 55 preferably has a high modulus of elasticity at the introduced resin temperature during injection molding. That is, the first fixing layer 55 which is cured when brought into contact with a resin introduced into the mold yields a strong adhesion effect. This allows strong adhesion of the resin and the first fixing layer 55 and makes it possible to prevent positional displacement of the graphite sheet laminate 81. Further, since the first fixing layer 55 spreads through unevenness on a surface of the graphite sheet 10 at the mold temperature and then cures at the introduced resin temperature, the graphite sheet 10 and the first fixing layer 55 can also favorably adhere to each other. That is, the first fixing layer 55 is preferably made of a material which has a certain degree of softness before introduction of a resin and has a higher modulus of elasticity when brought into contact with the resin. A resin of which the first fixing layer 55 is made is not particularly limited. For example, it is possible to appropriately use, as the resin, an acrylic resin, an epoxy resin, a phenol resin, or the like.

<Second Fixing Layer>

Figure 2:
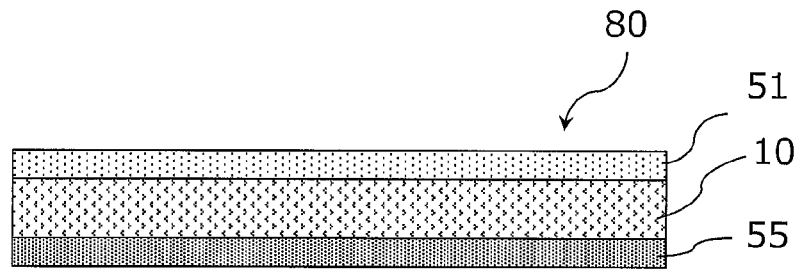
FIG. 2 is a cross-sectional view schematically illustrating a graphite sheet laminate of an embodiment.

A graphite sheet laminate 80 of the present invention may include a second fixing layer 51 which is provided on a principal surface of the graphite sheet 10 which principal surface is opposite from the first fixing layer 55 side principal surface of the graphite sheet 10 (see FIG. 2). The second fixing layer 51 which is provided with a support (described later) carries out a function of preventing positional displacement between the support and the graphite sheet 10. Further, the second fixing layer 51 which is provided with no support also carries out a function of boosting a low mechanical strength of the graphite sheet 10 and preventing a tear and a break in the graphite sheet 10.

It is preferable to select the second fixing layer 51 whose modulus of elasticity at the introduced resin temperature is preferably not less than $7.0\times10^4$ Pa and not more than $5.0\times10^8$ Pa, more preferably not less than $8.5\times10^4$ Pa and not more than $3.0\times10^8$ Pa, and still more preferably not less than $1.0\times10^5$ Pa and not more than $1.0\times10^8$ Pa. In a case where the second fixing layer 51 has a modulus of elasticity of not less than $7.0\times10^4$ Pa and not more than $5.0\times10^8$ Pa, it is possible to produce a molded product from the graphite sheet 10 without positional displacement of the second fixing layer 51.

The modulus of elasticity of the second fixing layer 51 at the introduced resin temperature may be not less than $9.6\times10^5$ and not more than $2.1\times10^6$. Also in a case where the second fixing layer 51 has a modulus of elasticity in the above range at the introduced resin temperature, it is possible to produce a molded product from the graphite sheet 10 without positional displacement of the second fixing layer 51.

Further, the second fixing layer 51 preferably has a modulus of elasticity of not less than $1.0\times10^4$ Pa and not more than $5.0\times10^7$ Pa at the mold temperature and a modulus of elasticity of not less than $7.0\times10^4$ Pa and not more than $5.0\times10^8$ Pa at the introduced resin temperature.

The first fixing layer 55 more preferably has a modulus of elasticity of not less than $5.0\times10^4$ Pa and not more than $3.0\times10^7$ Pa at the mold temperature and a modulus of elasticity of not less than $8.5\times10^4$ Pa and not more than $3.0\times10^8$ Pa at the introduced resin temperature. The first fixing layer 55 still more preferably has a modulus of elasticity of not less than $8.0\times10^4$ Pa and not more than $1.0\times10^7$ Pa at the mold temperature and a modulus of elasticity of not less than $1.0\times10^5$ Pa and not more than $1.0\times10^8$ Pa at the introduced resin temperature.

More specifically, the modulus of elasticity of the second fixing layer 51 at the mold temperature may be not less than $5.0\times10^5$ and not more than $1.0\times10^7$. Further, the second fixing layer 51 may have a modulus of elasticity of not less than $5.0\times10^5$ and not more than $1.0\times10^7$ at the mold temperature and a modulus of elasticity of not less than $9.6\times10^5$ and not more than $2.1\times10^6$ at the introduced resin temperature.

Note here that the modulus of elasticity at the mold temperature refers to a modulus of elasticity at any temperature in a range of 70° C. to 150° C. (e.g., 80° C.). Note also that the modulus of elasticity at the introduced resin temperature refers to a modulus of elasticity at any temperature in a range of 230° C. to 350° C. (e.g., 250° C. or 310° C.). It is preferable to use the second fixing layer 51 whose modulus of elasticity at any temperature in the range of 70° C. to 150° C. is a modulus of elasticity in the above range at the mold temperature and whose modulus of elasticity at any temperature in the range of 230° C. to 350° C. raised from the any temperature in the range of 70° C. to 150° C. is a modulus of elasticity in the above range at the introduced resin temperature.

The second fixing layer 51 preferably has a high modulus of elasticity at the introduced resin temperature during injection molding.

A resin of which the second fixing layer 51 is made is not particularly limited. For example, it is possible to appropriately use, as the resin, an acrylic resin, an epoxy resin, a phenol resin, or the like.

<Support>

Figure 3:
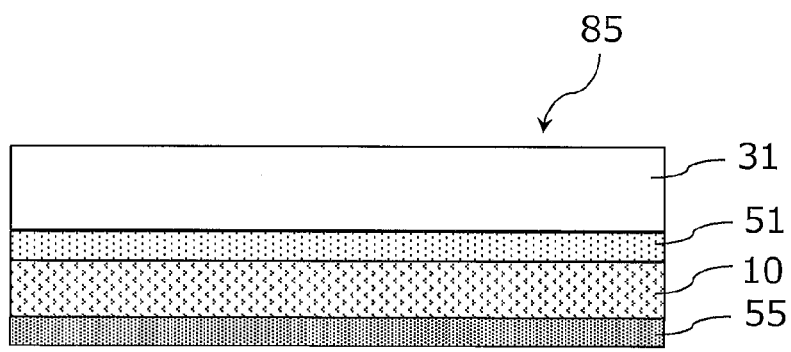
FIG. 3 is a cross-sectional view schematically illustrating a graphite sheet laminate of an embodiment.

It is preferable that a support be fixed to the graphite sheet laminate. The support is a material for boosting a mechanical strength of a graphite sheet. As illustrated in FIG. 3, as compared with the graphite sheet 10 alone, the graphite sheet 10 which is fixed to a support 31 allows a graphite sheet laminate 85 to have higher mechanical characteristics (rigidity and elasticity). In a case where the graphite sheet laminate 85 is subjected to injection molding (insert molding), it is possible to prevent a trouble such as a rupture or a break occurring in the graphite sheet 10 due to a resin pressure (injection pressure) during injection molding.

The support 31 may be, for example, a resin film such as a PET film, an acrylic film, an ABS film, a PEN film, or a PE film, or metallic foil such as aluminum foil, copper foil, or SUS foil.

A method for forming the support 31 is exemplified by, but not particularly limited to a method in which film materials are combined by lamination and a method in which a liquid resin is formed by coating. Alternatively, it is possible to provide a fixing layer (e.g., the second fixing layer) such as an adhesive between the support 31 and the graphite sheet 10. For example, in a case where the fixing layer is made of a material which is similar to that for the first fixing layer 55 provided on the principal surface of the graphite sheet 10, it is possible to favorably maintain a strength with which the graphite sheet 10 and the support 31 adhere to each other.

From the viewpoint of prevention of, for example, cracking of the graphite sheet 10 by an increase in mechanical strength of the graphite sheet laminate 85, the support 31 has a modulus of elasticity in tension preferably of not less than 1 GPa, more preferably of not less than 2 GPa, and still more preferably of not less than 3 GPa. A thickness of the support 31, which thickness can be appropriately set so as to satisfy the aforementioned mechanical strength characteristics, is preferably 1 μm to 50 μm, more preferably 2 μm to 25 μm, and still more preferably 4 μm to 18 μm. The support 31 whose thickness is set to 1 μm to 50 μm allows a reduction in warpage of a molded product which includes the graphite sheet laminate 85. In order to provide the support 31 with design characteristics, it is possible to use a colored support as the support 31 or carry out printing or coating with respect to the support 31.

The thickness of the support 31 may be not more than 50 μm (e.g., 1 μm to 50 μm), not more than 25 μm (e.g., 1 μm to 25 μm), not more than 18 μm (e.g., 1 μm to 18 μm), or not more than 9 μm (e.g., 1 μm to 9 μm).

<Graphite Sheet>

The graphite sheet 10 for use in the present invention is a polymeric graphite sheet. The polymeric graphite sheet is obtained by carbonating a polymeric film by heat treatment and then graphitizing the polymeric film. A suitably usable polymeric graphite sheet is exemplified by, for example, a polymeric graphite sheet which has a thermal conduction anisotropy such that the polymeric graphite sheet has a thermal conductivity of approximately 400 W/(m·K) to 1700 W/(m·K) in a sheet surface direction and a thermal conductivity of approximately 5 W/(m·K) to 20 W/(m·K) in a thickness direction. Such a polymeric graphite sheet whose thermal conduction anisotropy is high can be obtained by, for example, a publicly-known method. For example, a graphite sheet which can be obtained by heat-treating a polyimide film at a temperature of not less than 2400° C. can satisfy the thermal conduction anisotropy.

A thickness of the graphite sheet 10 is preferably 1 μm to 250 μm, more preferably 3 μm to 150 μm, and still more preferably 5 μm to 100 μm. The graphite sheet 10 which has a thickness in the above range not only allows an improvement in heat dispersion characteristic of a composite molded product of the present invention which composite molded product is used in an electronic device or the like but also allows the composite molded product (i.e., electronic device or the like) to be thinner. From the viewpoint of a thinner composite molded product and a higher strength with which the graphite sheet 10 is fixed to the support, the graphite sheet 10 particularly preferably has a thickness of not more than 40 μm.

More specifically, the thickness of the graphite sheet 10 is preferably not more than 150 μm (e.g., 1 μm to 150 μm), more preferably not more than 100 μm (e.g., 1 μm to 100 μm), still more preferably not more than 40 μm (e.g., 1 μm to 40 μm), and most preferably not more than 25 μm (e.g., 1 μm to 25 μm). The graphite sheet 10 which has a thickness in the above range not only allows an improvement in heat dispersion characteristic of a composite molded product of the present invention which composite molded product is used in an electronic device or the like but also allows the composite molded product (i.e., electronic device or the like) to be thinner.

From the viewpoint of, while maintaining a thermal conductivity anisotropy of the graphite sheet 10, increasing elasticity and rigidity of a graphite sheet laminate which includes the graphite sheet 10, the thickness of the graphite sheet 10 is preferably 5% to 75%, more preferably 7% to %, still more preferably 10% to 50%, and most preferably 12% to 40% of a thickness of the entire graphite sheet laminate of the present invention. In a case where a thickness ratio of the graphite sheet 10 to the graphite sheet laminate falls within the above range, the mechanical characteristics (rigidity, elasticity, and the like) and thermal characteristics (a heat ray expansion coefficient and the like) of the graphite sheet laminate are controlled mainly by characteristics of the support 31. This tends to prevent deformation and cracking, and positional displacement of the graphite sheet 10 during injection molding, and also to prevent warpage occurring in a composite molded product due to a difference in heat ray expansion coefficient between an injection molding resin and the graphite sheet 10.

Also in the case of the resin molded product which is provided with no support 31, from the viewpoint of, while maintaining the thermal conductivity anisotropy of the graphite sheet 10, increasing elasticity and rigidity of a graphite sheet laminate which includes the graphite sheet 10, the thickness of the graphite sheet 10 is preferably 5% to 75%, more preferably 7% to 60%, still more preferably 10% to 50%, and most preferably 12% to 40% of the thickness of the entire graphite sheet laminate of the present invention. In a case where the thickness ratio of the graphite sheet 10 to the graphite sheet laminate falls within the above range, though the present invention which is provided with no support 31 is slightly inferior to the present invention which is provided with the support 31, as compared with a conventional technique, the present invention tends to further prevent deformation and cracking, and positional displacement of the graphite sheet 10 during injection molding, and also to further prevent warpage occurring in a composite molded product due to a difference in heat ray expansion coefficient between an injection molding resin and the graphite sheet 10.

In order to prevent occurrence of, for example, cracking, positional displacement, and poor appearance in the graphite sheet 10 during injection molding, the graphite sheet 10 itself only needs to have a modulus of elasticity preferably of not less than 1 GPa and more preferably of not less than 5 GPa. Meanwhile, according to study carried out by inventors of the present invention, in a case where a laminate which includes the graphite sheet 10 and the support 31 is subjected to injection molding, a smaller thickness of the graphite sheet 10 tends to further prevent warpage of the resin molded product. Therefore, the thickness of the graphite sheet 10 preferably falls within the above range.

The graphite sheet 10 preferably has a through hole. The graphite sheet 10 has an aperture ratio preferably of not less than 2% and not more than 40%, more preferably of not less than 3% and not more than 30%, and still more preferably of not less than 5% and not more than 20%. The graphite film 10 which has an aperture ratio of not less than 2% causes the through hole to carry out a function of reducing warpage, so that the resin molded product which is small in warpage can be obtained. Meanwhile, the graphite film 10 which has an aperture ratio of not more than 40.0% can maintain a high heat radiation characteristic of the resin molded product.

<Thickness of Graphite Sheet Laminate>

The graphite sheet laminate has a thickness preferably of not more than 250 μm, more preferably of not more than 150 μm, still more preferably of not more than 100 μm, and particularly preferably of not more than 80 μm. The graphite sheet laminate which has a thickness of not more than 250 μm is favorable due to its capability to reduce warpage of the resin molded product.

<Tensile Strength of Graphite Sheet Laminate>

As for a strength of the graphite sheet laminate, the graphite sheet laminate has a tensile strength of not less than 80 MPa, more preferably of not less than 150 MPa, and still more preferably of not less than 200 MPa. The graphite sheet laminate which has a tensile strength of not less than 80 MPa makes it possible to prevent a tear and a break which occur in the graphite sheet laminate during injection molding.

<Configuration of Graphite Sheet Laminate>

The graphite sheet laminate of the present invention includes the first fixing layer which is provided on one of the principal surfaces of the graphite sheet. The first fixing layer 55, which is provided in the mold so as to be in contact with the injected resin (see FIG. 1), prevents positional displacement of the graphite sheet laminate 81.

The second fixing layer 51 may be provided on the principal surface of the graphite sheet 10 which principal surface is opposite from the first fixing layer 55 side principal surface of the graphite sheet 10 (see FIG. 2). The second fixing layer 51 which is provided with a support (described later) carries out a function of preventing positional displacement between the support and the graphite sheet 10. Further, the second fixing layer 51 which is provided with no support also carries out a function of boosting a low mechanical strength of the graphite sheet 10 and preventing a tear and a break in the graphite sheet 10.

Further, as illustrated in FIG. 3, the support 31 may be provided on a surface of the second fixing layer 51 which surface is opposite from the graphite sheet 10 side surface of the second fixing layer 51. The support 31 carries out a function of boosting a low mechanical strength of the graphite sheet 10 and preventing a tear and a break in the graphite sheet 10.

Figure 4:
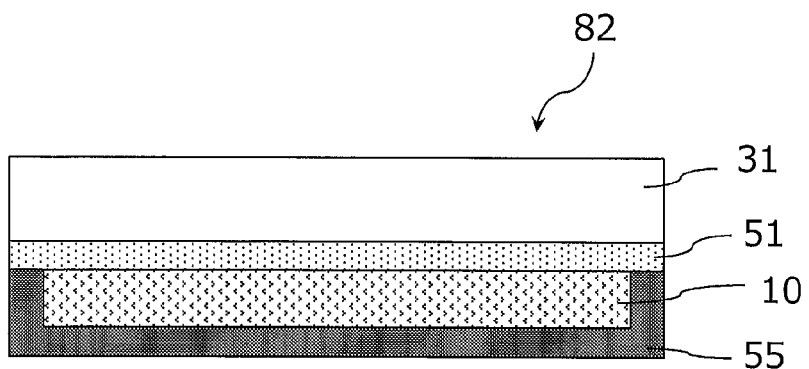
FIG. 4 is a cross-sectional view schematically illustrating a graphite sheet laminate of an embodiment.

In order to effectively prevent positional displacement and deformation due to an injection pressure of a resin, a side peripheral part of the graphite sheet 10 which side peripheral part is covered with the first fixing layer 55 may allow the graphite sheet 10 to be sealed by the support 31 (or second fixing layer 51) and the first fixing layer 55 (see FIG. 4). Note that side surfaces of the graphite sheet 10 may be covered with the second fixing layer 51. Alternatively, the side surfaces of the graphite sheet 10 may be covered with both the second fixing layer 51 and the first fixing layer 55.

<Resin Molded Product>

Figure 5:
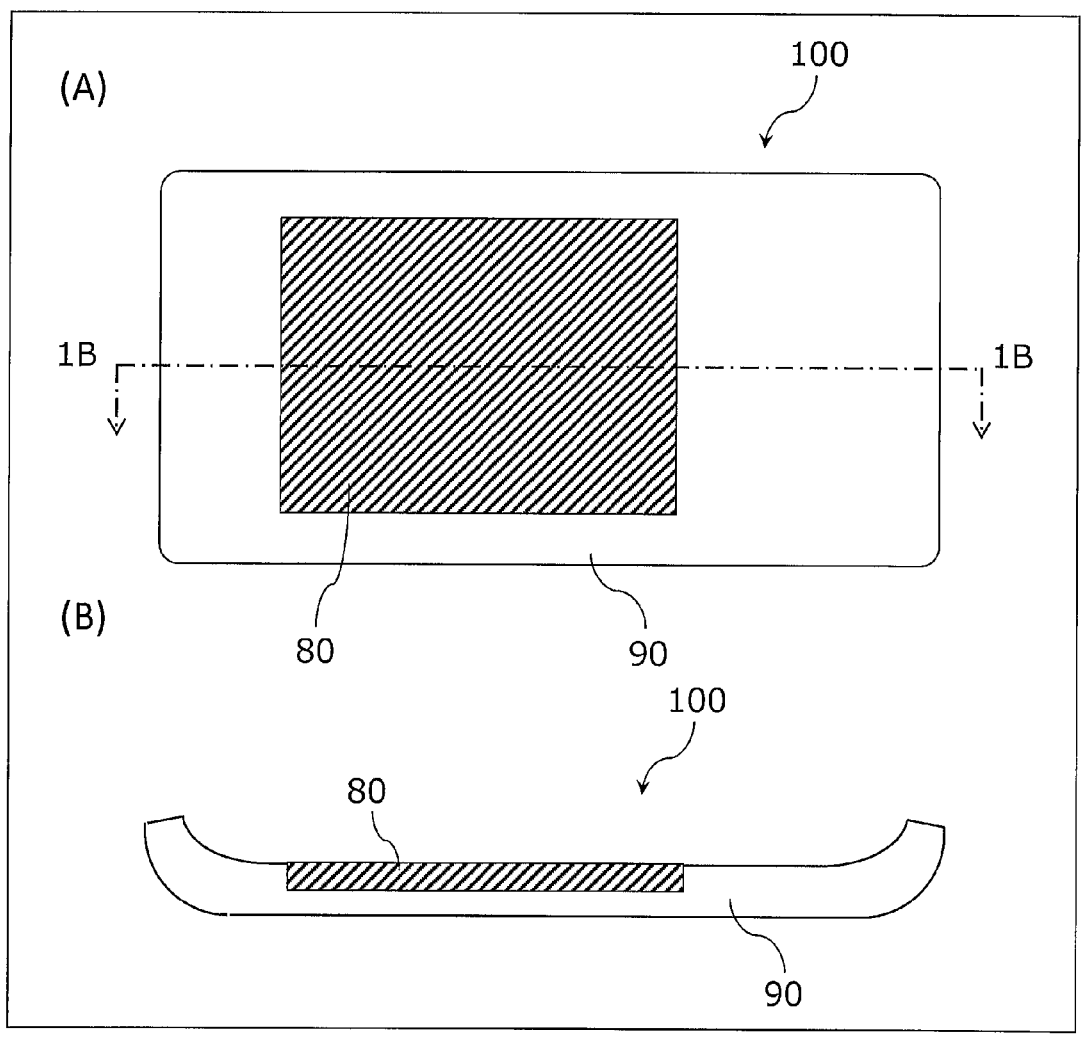
FIG. 5 schematically illustrates a resin molded product of an embodiment. (A) of FIG. 5 is a plan view of the resin molded product, and (B) of FIG. 5 is a cross-sectional view of the resin molded product which cross-sectional view is taken from line 1B-1B of (A) of FIG. 5.

FIG. 5 illustrates a resin molded product 100 of an embodiment. (A) of FIG. 5 is a plan view of the resin molded product 100, and (B) of FIG. 5 is a cross-sectional view of the resin molded product 100. The resin molded product 100 of the present invention is obtained by integrally molding the graphite sheet laminate 80 and a resin 90.

<Method for Producing Resin Molded Product>

The resin molded product can be produced by an insert molding method in which the graphite sheet laminate 81 is placed in a molding mold (see FIG. 1) and then a resin material is injection-molded in that mold. The mold for use in the method of the present invention for producing the resin molded product is exemplified by, but not particularly limited to a mold for use in general injection molding.

The graphite sheet laminate 81 is provided along the cavity surface 110 of one of the injection molding molds so that the principal surface of the graphite sheet laminate 81 which principal surface is opposite from the first fixing layer 55 side principal surface of the graphite sheet laminate 81 is in contact with the cavity surface 110 (see FIG. 1). Then, the injection molding molds are clamped together, and the resin in the molten state is injected into the cavity (i.e., the resin in the molten state is injected into a space between the cavity surface 110 of one of the injection molding molds and a counter surface 120 of the other of the injection molding molds) so as to cause adhesion of the graphite sheet laminate 81 and the resin. That is, the graphite sheet laminate 81 is placed in the mold so that the first fixing layer 55 is in contact with an introduced resin. Then, the principal surface of the graphite sheet laminate 81 which principal surface is opposite from the first fixing layer 55 side principal surface of the graphite sheet laminate 81 is formed as a part of a surface layer of the resin molded product.

A position at which the graphite sheet laminate 81 is provided in the mold is not particularly limited. Note, however, that the graphite sheet laminate 81 is preferably provided directly below a resin inlet. In a space directly below the resin inlet, the injection pressure of the resin is large in pressure component in a direction perpendicular to a surface of the graphite sheet laminate 81. This causes a force against a mold side surface to be applied to the graphite sheet laminate 81. Meanwhile, the injection pressure of the resin is small in pressure component in a plane direction of the graphite sheet laminate 81. This reduces a shearing force applied to the graphite sheet laminate 81 by the injection pressure of the resin. Therefore, it is possible to prevent positional displacement of the graphite sheet 10, which positional displacement is caused in a case where the graphite sheet 10 is carried away by the injection pressure, deformation of the graphite sheet 10, and the like.

Further, the graphite sheet laminate 81 is preferably provided at a position in the mold which position is the most distant from the resin inlet. Since the injection pressure is made lower in accordance with a pressure loss at a position distant from the resin inlet, the shearing force applied to the graphite sheet laminate 81 is reduced. This makes it possible to prevent positional displacement of the graphite sheet 10, deformation of the graphite sheet 10, and the like.

In a case where a thickness of a part of the cavity in which part the graphite sheet laminate 81 is provided (i.e., a distance between the cavity surface 110 of one of the injection molding molds and the counter surface 120 of the other of the injection molding molds) is not more than 1.0 mm, further not more than 0.8 mm, and particularly not more than 0.6 mm, a higher injection pressure is applied to the graphite sheet laminate 81. This easily causes positional displacement and deformation of an inserted material. However, use of the graphite sheet laminate 81 of the present invention makes it possible to carry out injection molding without positional displacement and deformation.

(Resin for Use in Injection Molding)

The resin for use in injection molding of the present invention is exemplified by, but not particularly limited to a resin for use in general injection molding. Examples of the resin for use in injection molding include vinyl polymers such as polyethylene, polypropylene, polyvinyl chloride, polyvinyl acetate, polystyrene, an ethylene-vinyl acetate copolymer (EVA), an ethylene-acrylic acid copolymer, an ethylene-methacrylic acid copolymer (EMMA), an acrylonitrile-styrene copolymer (AS), and an acrylonitrile-butadiene-styrene copolymer (ABS), polyester polymers such as polyethylene terephthalate, polyethylene naphthalate, polybutylene terephthalate, and polyarylate, polyamide polymers such as nylon 6 and nylon 6,6, polyacetal, polyphenylene sulfide (PPS), liquid crystalline polyester, polyimide, polyamide-imide, syndiotactic polystyrene, a fluoropolymer, modified polyphenylene ether, polyether sulfone (PES), aromatic polyether ketone (PEK), polyether ether ketone (PEEK), polycarbonate, a liquid crystal polymer, polysulfone (PSF), polyamide-imide, polyetherimide, other engineering plastics, and super engineering plastics.

In particular, a fiber-reinforced resin containing glass fiber or carbon fiber is suitably used to obtain a molded product which is small in thickness and high in strength. Such a fiber-reinforced resin has a high melt viscosity and thus tends to have a higher resin pressure during injection molding. Therefore, in a case where a graphite sheet alone is subjected to injection molding, poor appearance of the graphite sheet due to deformation and positional displacement of the graphite sheet easily occur. Meanwhile, since the graphite sheet laminate in which the graphite sheet is fixed to the support is used in the present invention, poor appearance and positional displacement of the graphite sheet are prevented even if a fiber-reinforced resin having a high melt viscosity is used. Further, adjustment of characteristics of a surface of the support allows the surface to be smoother and also makes it possible to reduce a shearing stress applied to the graphite sheet laminate by the injection pressure of the resin.

It goes without saying that the present invention does not need to be configured to include the support described above. As compared with a conventional technique, the present invention which includes no support further prevents poor appearance and positional displacement of the graphite sheet than a conventional technique even if a fiber-reinforced resin having a high melt viscosity is used. Further, as compared with a conventional technique, the present invention which includes no support makes it possible to further reduce the shearing stress applied to the graphite sheet laminate by the injection pressure of the resin.

(Introduced Resin Temperature During Injection Molding)

A condition for use in general injection molding is usable for the introduced resin temperature during injection molding of the present invention. Note that the graphite sheet, which has a high thermal conductivity in a plane direction and has a low thermal conductivity in a thickness direction, has a heat insulation effect on a resin layer, the support, and the like which are provided so as to be adjacent to each other. Therefore, in a case where injection molding is carried out with respect to the graphite sheet side surface of the graphite sheet laminate, a change in quality of the graphite sheet laminate by heat can be prevented even if the resin temperature slightly exceeds respective heat-resistant temperatures of the resin layer and the support.

As the introduced resin temperature during injection molding of the present invention rises to not less than 230°

C., not less than 260° C., not less than 290° C., and not less than 310° C., higher heat is applied to the graphite sheet laminate. This easily causes positional displacement and deformation of the inserted material. However, use of the graphite sheet laminate of the present invention makes it possible to carry out injection molding without positional displacement and deformation.

The present invention can also be configured as below.

<1> The present invention relates to a method for producing a resin molded product, including the steps of: providing, along a cavity surface of one of injection molding molds, a graphite sheet laminate having a structure in which a first fixing layer having a modulus of elasticity of not less than $7.0 \times 10^4$ Pa and not more than $5.0 \times 10^7$ Pa at an introduced resin temperature during injection molding is in contact with a graphite sheet on at least one of principal surfaces of the graphite sheet, the graphite sheet laminate being provided so that a principal surface of the graphite sheet laminate which principal surface is opposite from the first fixing layer side principal surface of the graphite sheet laminate is in contact with the cavity surface; clamping the injection molding molds together; and injecting a resin in a molten state into a cavity so as to cause adhesion of the graphite sheet laminate and the resin.

<2> The present invention relates to the method mentioned in <1>, wherein a second fixing layer having a modulus of elasticity of not less than $7.0 \times 10^4$ Pa and not more than $5.0 \times 10^8$ Pa at the introduced resin temperature during injection molding is provided on a principal surface of the graphite sheet laminate which principal surface is opposite from the first fixing layer side principal surface of the graphite sheet laminate.

<3> The present invention relates to the method mentioned in <1> or <2>, wherein the introduced resin temperature during injection molding is not less than 230° C. and not more than 350° C.

<4> The present invention relates to the method mentioned in any one of <1> through <3>, wherein a support is further provided on a principal surface of the second fixing layer which principal surface is opposite from the graphite sheet side principal surface of the second fixing layer.

<5> The present invention relates to a graphite sheet laminate having a structure in which a first fixing layer having a modulus of elasticity of not less than $1.0 \times 10^4$ Pa and not more than $5.0 \times 10^6$ Pa at 80° C. and having a modulus of elasticity of not less than $7.0 \times 10^4$ Pa and not more than $5.0 \times 10^7$ Pa at 250° C. is in contact with a graphite sheet on one of principal surfaces of the graphite sheet.

<6> The present invention relates to the graphite sheet laminate mentioned in <5>, further having a structure in which a second fixing layer having a modulus of elasticity of not less than $1.0 \times 10^4$ Pa and not more than $5.0 \times 10^7$ Pa at 80° C. and having a modulus of elasticity of not less than $7.0 \times 10^4$ Pa and not more than $5.0 \times 10^8$ Pa at 250° C. is in contact with a graphite sheet on the other of the principal surfaces of the graphite sheet.

<7> The present invention relates to the graphite sheet laminate mentioned in <5> or <6>, wherein the first fixing layer has a higher modulus of elasticity at 250° C. than at 80° C.

<8> The present invention relates to the graphite sheet laminate mentioned in any one of <5> through <7>, wherein the second fixing layer has a higher modulus of elasticity at 250° C. than at 80° C.

<9> The present invention relates to the graphite sheet laminate mentioned in any one of <6> through <8>, wherein: the second fixing layer is provided on a surface of the graphite sheet which surface is opposite from a principal surface of the graphite sheet; and a support is further provided on a surface of the second fixing layer which surface is opposite from the graphite sheet side surface of the second fixing layer.

EXAMPLES

The following description more specifically describes the present invention with reference to Examples. However, the present invention is not limited by the Examples.

Note that Examples and Comparative Examples evaluated moldability and the like of the resin molded product in accordance with the following criteria.

[Evaluation Method]
<Measurement of Tensile Strength>

The tensile strength of the graphite sheet laminate was measured by use of a tensile testing machine (Strograph VES1D manufactured by Toyo Seiki Seisaku-sho, Ltd.) in conformity with JIS K 7078. The measurement was carried out at a distance between zippers of 100 mm, at a tension speed of 50 mm/min, and at a room temperature (in an atmosphere at 25° C.)), and an average of tensile strengths obtained by carrying out the measurement three times was set as the tensile strength of the graphite sheet laminate.

[Evaluation of Resin Molded Product]
<Positional Displacement>

It was evaluated by visual recognition and by use of an area retention rate whether or not positional displacement of the graphite sheet laminate occurred in the resin molded product. The area retention rate refers to an area ratio (%) of a part of a graphite sheet (GS) of a composite laminate which part is retained in a place of the mold in which place the graphite sheet laminate was provided (a region of 30 mm×30 mm). The evaluation by visual recognition was carried out in accordance with the following criteria:

A: a state in which the graphite sheet laminate retains its original surface shape without being displaced from a place of the mold in which place the graphite sheet laminate was provided B: a state in which the graphite sheet laminate is retained in the molded product while being slightly displaced from the place of the mold in which place the graphite sheet laminate was provided <Appearance (Shape Retentivity)>

Appearance of the composite molded product was evaluated by visually recognizing a state of a wrinkle, a crack, and a tear in the graphite sheet laminate.

A: a state in which the graphite sheet laminate has no wrinkle and no crack

B: a state in which the graphite sheet laminate has a wrinkle but has no crack

C: a state in which the graphite sheet laminate has been broken into pieces and cannot retain its original size (no composite molded product can be obtained through insert molding)

<Warpage>

The resin molded product was evaluated by use of an amount of warpage of the resin molded product which was placed on a level surface (a distance between the level surface and an end surface of the molded product).

A: No warpage can be visually recognized (an amount of warpage is less than 2.0 mm).

B: Warpage can be visually recognized (an amount of warpage is not less than 2.0 mm [fixing layer]).

[Fixing Layer]

The first fixing layer and the second fixing layer were made of the following materials. Note that Table 1 shows moduli of elasticity of fixing layers A through C.

<Fixing Layer A>
an acrylic resin A (NeoFix10 manufactured by NICHIEI KAKOH CO., LTD.)

<Fixing Layer B>
an epoxy film (TSU0041 SI-10DL manufactured by TOYOCHEM CO., LTD.)

<Fixing Layer C>
an acrylic resin B (JELCON binder ink G-2S manufactured by JUJO CHEMICAL CO., LTD.)

<Fixing Layer D>
an acrylic resin C

<Fixing Layer E>
an acrylic resin D

<Measurement of Modulus of Elasticity>

A modulus of elasticity was measured by use of a dynamic viscoelasticity measuring apparatus (ARES manufactured by TA Instruments Japan Inc.) at a sample thickness of 0.5 mm, at a frequency of 1 Hz, at a rate of temperature increase of 5° C./min, and in a temperature range of 25° C. to 320° C.

TABLE 1

| | Modulus of elasticity (Pa) | | | | |
|---|---|---|---|---|---|
| | 25° C. | 80° C. | 200° C. | 250° C. | 310° C. |
| Fixing layer A | $8.0 \times 10^4$ | $5.0 \times 10^4$ | $5.0 \times 10^2$ | — | — |
| Fixing layer B | $3.2 \times 10^9$ | $2.3 \times 10^9$ | $5.0 \times 10^8$ | $3.5 \times 10^8$ | $1.0 \times 10^8$ |
| Fixing layer C | $1.0 \times 10^7$ | $5.0 \times 10^5$ | $8.0 \times 10^5$ | $9.6 \times 10^5$ | $2.1 \times 10^6$ |
| Fixing layer D | $8.5 \times 10^6$ | $3.0 \times 10^5$ | $8.0 \times 10^4$ | $1.0 \times 10^5$ | $4.0 \times 10^6$ |
| Fixing layer E | $5.0 \times 10^7$ | $4.0 \times 10^6$ | $8.5 \times 10^6$ | $1.0 \times 10^7$ | $3.2 \times 10^7$ |

Example 1

<Preparation of Graphite Sheet Laminate>

By using, as the support, a polyethylene terephthalate film (PET) having a thickness of 18 μm, the acrylic resin B (fixing layer C) was applied as the second fixing layer to the entire one of surfaces of the support so that the acrylic resin B (fixing layer C) had a thickness of 18 μm after having been dried. Then, the graphite sheet having a thickness of 40 μm (having a thermal conductivity of 1500 W/(m·K)) was placed on the acrylic resin B (fixing layer C) so that the support and the graphite sheet were fixed to each other. Thereafter, the graphite sheet laminate 85 including the acrylic resin B (fixing layer C) which was provided as the first fixing layer and had a thickness of 10 μm (see FIG. 3) was obtained.

<Injection Molding>

The graphite sheet laminate 85 which had been cut so as to have a size of 40 mm×60 mm was placed so that the PET film side surface of the graphite sheet laminate 85 was in contact with an inner surface of the mold. Then, as illustrated in FIG. 1, the graphite sheet laminate 85 was provided in the mold of the injection molding machine so that the first fixing layer of the graphite sheet laminate served as a resin injection surface. Subsequently, by injection-molding 30% glass-fiber-reinforced polycarbonate, a graphite sheet-resin composite molded product was obtained which had a thickness of 0.6 mm and a size of 60 mm×120 mm and in which the graphite sheet laminate 85 was provided so as to be exposed on a surface of the molded product while being located in the molded product. The graphite sheet laminate 85 was fixed in the mold by a suction opening 45. The mold temperature was 80° C., and the resin introduction temperature was 310° C. Table 2 shows a result of Example 1.

Comparative Example 1

Comparative Example 1 was carried out as in the case of Example 1 except that the epoxy film (fixing layer B) was used instead of the acrylic resin B (fixing layer C). Note that the epoxy film was formed by retaining, by heat press at 80° C. at a normal pressure for 30 minutes, a semi-cured (B-stage) epoxy film and the graphite sheet which were combined, and thereafter retaining the semi-cured (B-stage) epoxy film and the graphite sheet at 130° C. at a pressure of 5 kg/cm² for 90 minutes so as to cure an epoxy resin. Table 2 shows a result of Comparative Example 1.

Comparative Example 2

Comparative Example 2 was carried out as in the case of Example 1 except that the acrylic resin A (fixing layer A) was used instead of the acrylic resin B (fixing layer C). Table 2 shows a result of Comparative Example 2.

TABLE 2

| | Graphite laminate | | | | | | | Evaluation | | | |
|---|---|---|---|---|---|---|---|---|---|---|---|
| | Structure | | | | | | | | | | |
| | Support | | Second fixing layer | | GS | First fixing layer | | | Positional displacement | | | |
| | Type | Thickness (μm) | Type | Thickness (μm) | Thickness (μm) | Type | Thickness (μm) | Thickness (μm) | Visual recognition | Area (%) | Appearance | Warpage |
| Ex. 1 | PET | 18 | C | 18 | 40 | C | 10 | 86 | A | 100 | A | A |
| Ex. 9 | PET | 18 | C | 18 | 40 | E | 10 | 86 | B | 100 | B | A |
| Comp. Ex. 1 | PET | 18 | C | 18 | 40 | B | 10 | 86 | C | 80 | A | A |
| Ex. 10 | PET | 18 | C | 18 | 40 | D | 10 | 86 | B | 100 | B | A |
| Comp. Ex. 2 | PET | 18 | C | 18 | 40 | A | 10 | 86 | C | 70 | B | A |

Abbreviation:
"Ex." stands for "Example".
"Comp. Ex." stands for "Comparative Example".

In Comparative Example 1, positional displacement of the graphite sheet laminate occurred due to a too high modulus of elasticity of the first fixing layer at 250° C. In contrast, positional displacement of the graphite sheet laminate was reduced by lowering the modulus of elasticity of the first fixing layer as in Example 9.

Meanwhile, in Comparative Example 2, adhesion between the injected resin and the graphite laminate was poor due to a too low modulus of elasticity of the first fixing layer at 250° C., so that positional displacement of the graphite sheet laminate occurred. In contrast, positional displacement of the graphite sheet laminate was reduced by increasing the modulus of elasticity of the first fixing layer as in Example 10.

Further, it was possible to eliminate positional displacement of the graphite sheet laminate by adjusting the modulus of elasticity of the first fixing layer at 250° C. to $9.6 \times 10^5$ as in Example 1.

sheet laminate was placed so that the graphite sheet side surface of the graphite sheet laminate was in contact with the inner surface of the mold. Then, as illustrated in FIG. 1, the graphite sheet laminate was provided in the mold of the injection molding machine so that the first fixing layer of the graphite sheet laminate served as the resin injection surface. Injection molding was thus carried out. Example 5 was carried out as in the case of Example 1 except for those described above. Table 3 shows a result of Example 5.

Example 6

Example 6 was carried out as in the case of Example 5 except that the acrylic resin B (fixing layer C) having a thickness of 10 μm was formed as the first fixing layer. Table 3 shows a result of Example 6.

Comparative Example 3

Comparative Example 3 was carried out as in the case of Example 1 except that the graphite sheet itself was used instead of the graphite sheet laminate.

TABLE 3

| | Graphite laminate | | | | | | | | Evaluation | | | |
|---|---|---|---|---|---|---|---|---|---|---|---|---|
| | Structure | | | | | | | | | | | |
| | Support | | Second fixing layer | | GS | First fixing layer | | | Tensile strength (MPa) | Positional displacement | | Appearance | Warpage |
| | Type | Thickness (μm) | Type | Thickness (μm) | Thickness (μm) | Type | Thickness (μm) | Thickness (μm) | | Visual recognition | Area (%) | | |
| Ex. 2 | PET | 50 | C | 18 | 40 | C | 10 | 118 | 250 | A | 100 | A | B |
| Ex. 3 | PET | 25 | C | 18 | 40 | C | 10 | 93 | 250 | A | 100 | A | A |
| Ex. 1 | PET | 18 | C | 18 | 40 | C | 10 | 86 | 220 | A | 100 | A | A |
| Ex. 4 | PET | 9 | C | 18 | 40 | C | 10 | 77 | 200 | A | 100 | A | A |
| Ex. 5 | — | — | — | — | 40 | C | 30 | 70 | 150 | A | 100 | A | A |
| Ex. 6 | — | — | — | — | 40 | C | 10 | 50 | 80 | A | 100 | B | A |
| Comp. Ex. 3 | — | — | — | — | 40 | — | — | 40 | 40 | — | — | C | A |

Abbreviation:
"Ex." stands for "Example".
"Comp. Ex." stands for "Comparative Example".

Example 2

Example 2 was carried out as in the case of Example 1 except that the polyethylene terephthalate film (PET) having a thickness of 50 μm was used. Table 3 shows a result of Example 2.

Example 3

Example 3 was carried out as in the case of Example 1 except that the polyethylene terephthalate film (PET) having a thickness of 25 μm was used. Table 3 shows a result of Example 3.

Example 4

Example 4 was carried out as in the case of Example 1 except that the polyethylene terephthalate film (PET) having a thickness of 9 μm was used. Table 3 shows a result of Example 4.

Example 5

Obtained was the graphite sheet laminate including the acrylic resin B (fixing layer C) which was provided, as the first fixing layer, on the graphite sheet having a thickness of 40 μm (having a thermal conductivity of 1500 W/(m·K)) and had a thickness of 30 μm. In injection molding, the graphite In Comparative Example 3, in which the graphite sheet alone having a small tensile strength was used, the graphite sheet was broken by a force of the resin which was being injected. This made it impossible to obtain the molded product with which the graphite sheet was combined. Meanwhile, in Example 6, in which the graphite sheet was provided with the first fixing layer having a thickness of 10 μm, a strength of the graphite sheet was boosted, so that a break occurred but a tear was prevented. In a case where the graphite sheet was provided with the first fixing layer having a thickness of 30 μm, it was possible to prevent both a tear and a break. Further, also in Examples 1 through 4, in each of which the PET film serving as the support strengthened the graphite sheet was formed as the support on a surface of the graphite sheet laminate which surface was provided with no first fixing layer. This made it possible to prevent a tear and a break. Note, however, that warpage occurred in the molded product in a case where the support had a thickness as large as 50 μm as in Example 2.

Example 7

Example 7 was carried out as in the case of Example 1 except that a polyethylene naphthalate film (PEN) was used instead of the polyethylene terephthalate film (PET). Table 4 shows a result of Example 7.

TABLE 4

| | Graphite laminate | | | | | | | | | | | | |
|---|---|---|---|---|---|---|---|---|---|---|---|---|---|
| | Structure | | | | | | | | | Evaluation | | | |
| | Support | | Second fixing layer | | GS | First fixing layer | | | Tensile strength (MPa) | Positional displacement | | | |
| | Type | Thickness (μm) | Type | Thickness (μm) | Thickness (μm) | Type | Thickness (μm) | Thickness (μm) | | Visual recognition | Area (%) | Appearance | Warpage |
| Ex. 1 | PET | 18 | C | 18 | 40 | C | 10 | 86 | 220 | A | 100 | A | A |
| Ex. 7 | PEN | 18 | C | 18 | 40 | C | 10 | 86 | 220 | A | 100 | A | A |

Abbreviation:
"Ex." stands for "Example".

Use of the polyethylene naphthalate film (PEN) instead of the polyethylene terephthalate film (PET) also made it possible to obtain a favorable molded product as in the case of use of the PET.

Example 8

Through holes having a diameter of 0.20 mm were formed on the graphite sheet by NC drilling, so that the through holes were provided at intervals of 0.5 mm (aperture ratio: 12.6%). The graphite sheet having the through holes was thus obtained. Example 8 was carried out as in the case of Example 2 except that the graphite sheet having the through holes was used. Table 5 shows a result of Example 8.

TABLE 5

| | Graphite laminate | | | | | | | | | | | | |
|---|---|---|---|---|---|---|---|---|---|---|---|---|---|
| | Structure | | | | | | | | | Evaluation | | | |
| | Support | | Second fixing layer | | GS | First fixing layer | | | Tensile strength (MPa) | Positional displacement | | | |
| | Type | Thickness (μm) | Type | Thickness (μm) | Thickness (μm) | Type | Thickness (μm) | Thickness (μm) | | Visual recognition | Area (%) | Appearance | Warpage |
| Ex. 2 | PET | 50 | C | 18 | 40 | C | 10 | 118 | 220 | A | 100 | A | B |
| Ex. 8 | PET | 50 | C | 18 | 40 (Hole) | C | 10 | 118 | 220 | A | 100 | A | A |

Abbreviation:
"Ex." stands for "Example".

Warpage seems to have been reduced because a stress caused by contraction after molding was absorbed by the through holes formed on the graphite sheet as in Example 8.

TABLE 6

| | Graphite laminate | | | | | | | | | | | |
|---|---|---|---|---|---|---|---|---|---|---|---|---|
| | Structure | | | | | | | | Evaluation | | | |
| | Support | | Second fixing layer | | GS | First fixing layer | | | Positional displacement | | | |
| | Type | Thickness (μm) | Type | Thickness (μm) | Thickness (μm) | Type | Thickness (μm) | Thickness (μm) | Visual recognition | Area (%) | Appearance | Warpage |
| Ex. 11 | PET | 18 | C | 18 | 150 | C | 10 | 196 | A | 100 | A | C |
| Ex. 12 | PET | 18 | C | 18 | 100 | C | 10 | 146 | A | 100 | A | B |
| Ex. 1 | PET | 18 | C | 18 | 40 | C | 10 | 86 | A | 100 | A | A |
| Ex. 13 | PET | 18 | C | 18 | 25 | C | 10 | 71 | A | 100 | A | A |

Abbreviation:
"Ex." stands for "Example".

Example 9

Example 9 was carried out as in the case of Example 1 except that the acrylic resin D (fixing layer E) having a thickness of 10 μm was formed as the first fixing layer. Table 2 shows a result of Example 9.

In Comparative Example 1, positional displacement of the graphite laminate occurred due to a too high modulus of elasticity of the first fixing layer at 250° C. In contrast, positional displacement of the graphite laminate was reduced by lowering the modulus of elasticity of the first fixing layer as in Example 9.

Example 10

Example 10 was carried out as in the case of Example 1 except that the acrylic resin C (fixing layer D) having a thickness of 10 μm was formed as the first fixing layer. Table 2 shows a result of Example 10.

In Comparative Example 2, adhesion between the graphite laminate and the injected resin was poor due to a too low modulus of elasticity of the first fixing layer at 250° C., so that positional displacement of the graphite laminate occurred. In contrast, positional displacement of the graphite laminate was reduced by increasing the modulus of elasticity of the first fixing layer as in Example 10.

Example 11

Example 11 was carried out as in the case of Example 1 except that the thickness of the graphite sheet was set at 150 μm. Table 6 shows a result of Example 11.

Example 12

Example 12 was carried out as in the case of Example 1 except that the thickness of the graphite sheet was set at 100 μm. Table 6 shows a result of Example 12.

Example 13

Example 13 was carried out as in the case of Example 1 except that the thickness of the graphite sheet was set at 25 μm. Table 6 shows a result of Example 13.

Examples 1, and 11 through 13 revealed that it is possible to reduce warpage of the resin molded product by causing the graphite sheet to have a small thickness.

The present invention is not limited to the description of the embodiments above, but may be altered by a skilled person within the scope of the claims. An embodiment based on a proper combination of technical means disclosed in different embodiments is encompassed in the technical scope of the present invention. Further, a new technical feature can be formed by combining technical means disclosed in the embodiments.

REFERENCE SIGNS LIST

10: Graphite sheet
21: Mold
31: Support
40: Gate
41: Resin introduction part
42: Thermocouple
45: Suction opening
51: Second fixing layer
55: First fixing layer
80, 81, 82, 85: Graphite sheet laminate
90: Resin
100: Resin molded product
110: Cavity surface
120: Counter surface

The invention claimed is:

1. A method for producing a resin molded product, comprising the steps of:
   providing, along a cavity surface of one of injection molding molds, a graphite sheet laminate having a structure in which a first fixing layer having a modulus of elasticity of not less than $7.0 \times 10^4$ Pa and not more than $5.0 \times 10^7$ Pa at an introduced resin temperature during injection molding is in contact with a graphite sheet on at least one of principal surfaces of the graphite sheet, the graphite sheet laminate being provided so that a principal surface of the graphite sheet laminate which principal surface is opposite from the first fixing layer side principal surface of the graphite sheet laminate is in contact with the cavity surface;
   clamping the injection molding molds together; and
   injecting a resin in a molten state into a cavity so as to cause adhesion of the graphite sheet laminate and the resin.

2. The method as set forth in claim 1, wherein a second fixing layer having a modulus of elasticity of not less than $7.0 \times 10^4$ Pa and not more than $5.0 \times 10^8$ Pa at the introduced resin temperature during injection molding is provided on a principal surface of the graphite sheet which principal surface is opposite from the first fixing layer side principal surface of the graphite sheet.

3. The method as set forth in claim 2, wherein a support is further provided on a principal surface of the second fixing layer which principal surface is opposite from the graphite sheet side principal surface of the second fixing layer.

4. The method as set forth in claim 3, wherein the support has a thickness of 1 μm to 50 μm.

5. The method as set forth in claim 1, wherein the introduced resin temperature during injection molding is not less than 230° C. and not more than 350° C.

6. The method as set forth in claim 1, wherein a thickness of the graphite sheet is 5% to 75% of a thickness of the graphite sheet laminate.

7. A method for producing a resin molded product, comprising the steps of:
   providing, along a cavity surface of one of injection molding molds, a graphite sheet laminate having a structure in which a first fixing layer having a modulus of elasticity of not less than $7.0 \times 10^4$ Pa and not more than $5.0 \times 10^7$ Pa at 250° C. is in contact with a graphite sheet on at least one of principal surfaces of the graphite sheet, the graphite sheet laminate being provided so that a principal surface of the graphite sheet laminate which principal surface is opposite from the first fixing layer side principal surface of the graphite sheet laminate is in contact with the cavity surface;
   clamping the injection molding molds together; and
   injecting a resin in a molten state into a cavity so as to cause adhesion of the graphite sheet laminate and the resin.

8. The method as set forth in claim 7, wherein a second fixing layer having a modulus of elasticity of not less than $7.0 \times 10^4$ Pa and not more than $5.0 \times 10^8$ Pa at the introduced resin temperature during injection molding is provided on a principal surface of the graphite sheet which principal surface is opposite from the first fixing layer side principal surface of the graphite sheet.

9. The method as set forth in claim 8, wherein a support is further provided on a principal surface of the second fixing layer which principal surface is opposite from the graphite sheet side principal surface of the second fixing layer.

10. The method as set forth in claim 9, wherein the support has a thickness of 1 μm to 50 μm.

11. The method as set forth in claim 7, wherein the introduced resin temperature during injection molding is not less than 230° C. and not more than 350° C.

12. The method as set forth in claim 7, wherein a thickness of the graphite sheet is 5% to 75% of a thickness of the graphite sheet laminate.

13. A graphite sheet laminate having a structure in which a first fixing layer having a modulus of elasticity of not less than $7.0 \times 10^4$ Pa and not more than $5.0 \times 10^7$ Pa at 250° C. is in contact with a graphite sheet on at least one of principal surfaces of the graphite sheet.

14. The graphite sheet laminate as set forth in claim 13, wherein the first fixing layer has a modulus of elasticity of not less than $1.0 \times 10^4$ Pa and not more than $5.0 \times 10^6$ Pa at 80° C.

15. The graphite sheet laminate as set forth in claim 13, wherein the first fixing layer has a higher modulus of elasticity at 250° C. than at 80° C.

16. The graphite sheet laminate as set forth in claim 13, further having a structure in which a second fixing layer having a modulus of elasticity of not less than $1.0 \times 10^4$ Pa and not more than $5.0 \times 10^7$ Pa at 80° C. and having a modulus of elasticity of not less than $7.0 \times 10^4$ Pa and not more than $5.0 \times 10^8$ Pa at 250° C. is in contact with the graphite sheet on a principal surface of the graphite sheet which principal surface is opposite from the first fixing layer side principal surface of the graphite sheet.

17. The graphite sheet laminate as set forth in claim 16, wherein the second fixing layer has a higher modulus of elasticity at 250° C. than at 80° C.

18. The graphite sheet laminate as set forth in claim 16, wherein:
the second fixing layer is provided on the principal surface of the graphite sheet which principal surface is opposite from the first fixing layer side principal surface of the graphite sheet; and
a support is further provided on a principal surface of the second fixing layer which principal surface is opposite from the graphite sheet side principal surface of the second fixing layer.

19. The graphite sheet laminate as set forth in claim 18, wherein the support has a thickness of 1 μm to 50 μm.

20. The graphite sheet laminate as set forth in claim 13, wherein a thickness of the graphite sheet is 5% to 75% of a thickness of the graphite sheet laminate.

* * * * *